(12) United States Patent
Mohler et al.

(10) Patent No.: US 9,517,577 B2
(45) Date of Patent: Dec. 13, 2016

(54) METHOD FOR APPLYING A BLADDER RELEASE AGENT BETWEEN A GREEN TIRE AND A BLADDER IN A TIRE CURING MACHINE

(71) Applicant: The Goodyear Tire & Rubber Company, Akron, OH (US)

(72) Inventors: Roger Allan Mohler, Uniontown, OH (US); John Michael Maloney, Uniontown, OH (US); Stephanie Pershern Gebby, Twinsburg, OH (US); Joshua Randall Elsass, Wadsworth, OH (US); Nathan Andrew Hunt, Lewis Center, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/092,882

(22) Filed: Apr. 7, 2016

(65) Prior Publication Data
US 2016/0229091 A1    Aug. 11, 2016

Related U.S. Application Data

(62) Division of application No. 13/960,905, filed on Aug. 7, 2013, now Pat. No. 9,333,677.

(51) Int. Cl.
*B29D 30/06* (2006.01)
*B29C 33/58* (2006.01)
*B29C 37/00* (2006.01)
*B29D 30/00* (2006.01)
*B29K 105/24* (2006.01)

(52) U.S. Cl.
CPC ........... *B29C 33/58* (2013.01); *B29D 30/0005* (2013.01); *B29D 30/0654* (2013.01); *B29C 37/0067* (2013.01); *B29D 30/0061* (2013.01); *B29D 2030/0659* (2013.01); *B29K 2105/246* (2013.01)

(58) Field of Classification Search
CPC ............ B29D 30/0005; B29D 30/0061; B29D 30/0645; B29D 2030/0022; B29D 2030/0659; B29C 33/58; B29C 37/0067; B29C 2037/92
See application file for complete search history.

(56) References Cited

U.S. PATENT DOCUMENTS

| | | |
|---|---|---|
| 2,761,489 A | 9/1956 | Kraft |
| 3,967,978 A | 7/1976 | Honda et al. |
| 3,990,930 A | 11/1976 | Schmit |
| 4,125,639 A | 11/1978 | Brandl |
| 4,310,427 A | 1/1982 | Wun |
| 4,359,340 A | 11/1982 | Comper et al. |
| 4,431,452 A | 2/1984 | Comper et al. |
| 4,547,544 A | 10/1985 | Allardice |
| 4,625,101 A | 11/1986 | Hinks et al. |
| 5,152,950 A | 10/1992 | Ona et al. |

(Continued)

*Primary Examiner* — James Mackey
(74) *Attorney, Agent, or Firm* — Robert N. Lipcsik

(57) ABSTRACT

A lubricating system indirectly applies a bladder release agent to a green tire and cures the green tire in a tire curing machine. The system includes a deposition device and a curing bladder. The deposition device directly applies bladder release agent on to a deposition bladder. The deposition bladder is inflated within the green tire in order to deposit the bladder release agent on to an inner surface of the green tire. The curing bladder subsequently receives the green tire with bladder release agent deposited therein and cures the green tire.

1 Claim, 16 Drawing Sheets

(56) References Cited

U.S. PATENT DOCUMENTS

| | | | |
|---|---|---|---|
| 5,309,971 | A | 5/1994 | Baker et al. |
| 5,556,588 | A | 9/1996 | Coyne et al. |
| 5,631,028 | A | 5/1997 | Mizokawa et al. |
| 6,077,469 | A | 6/2000 | Golightly et al. |
| 6,231,026 | B1 | 5/2001 | Patitsas et al. |
| 6,401,777 | B1 | 6/2002 | Verbeke-Ensch et al. |
| 7,122,220 | B1 | 10/2006 | Hawkins et al. |
| 7,128,545 | B2 | 10/2006 | Wang et al. |
| 7,943,201 | B2 | 5/2011 | Hendricks, Sr. |
| 7,992,611 | B2 | 8/2011 | Imhoff et al. |
| 8,079,389 | B2 | 12/2011 | Shepherd |
| 8,151,849 | B2 | 4/2012 | Ueyoko |
| 2011/0262573 | A1 | 10/2011 | Tanno et al. |

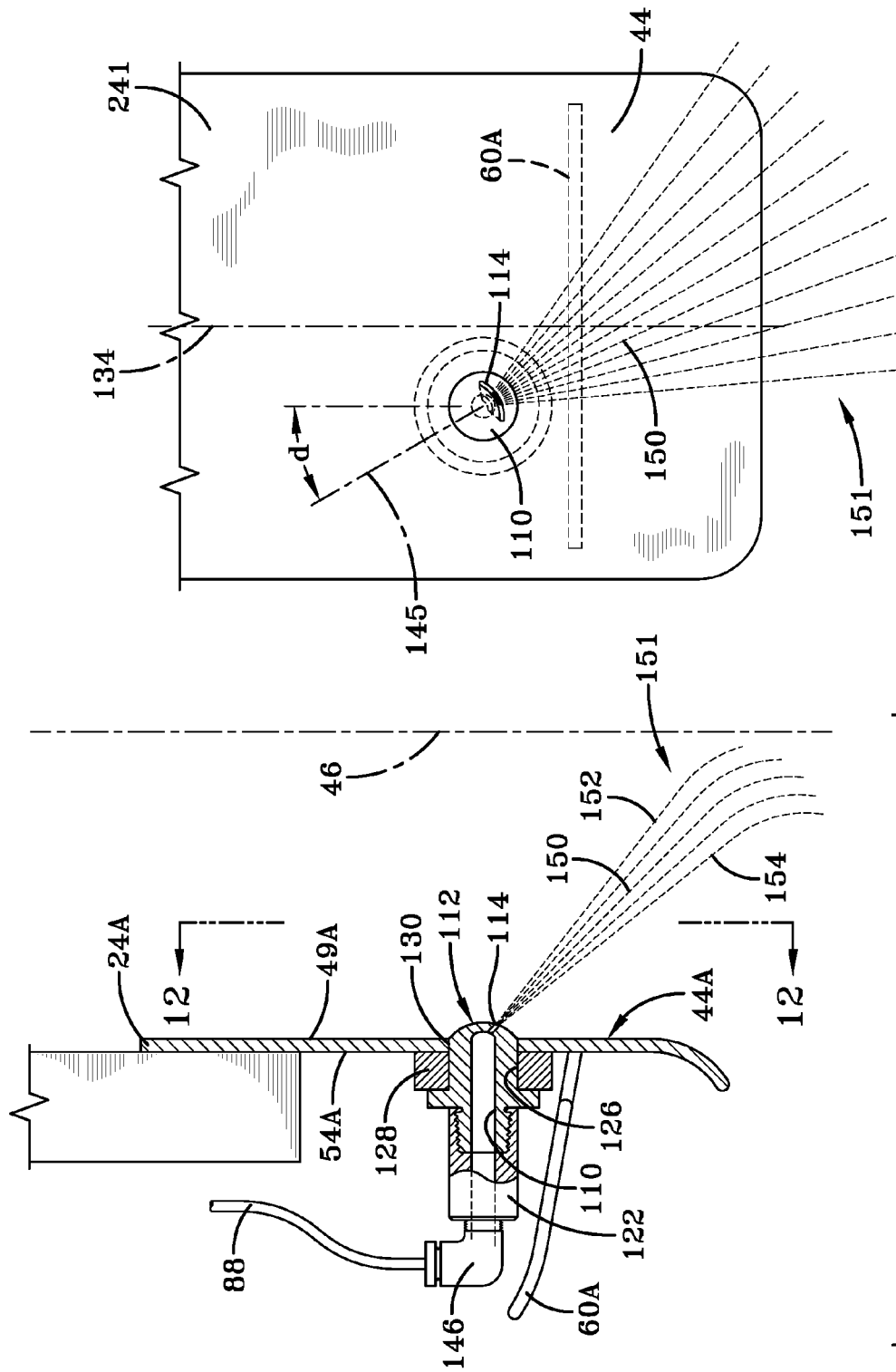

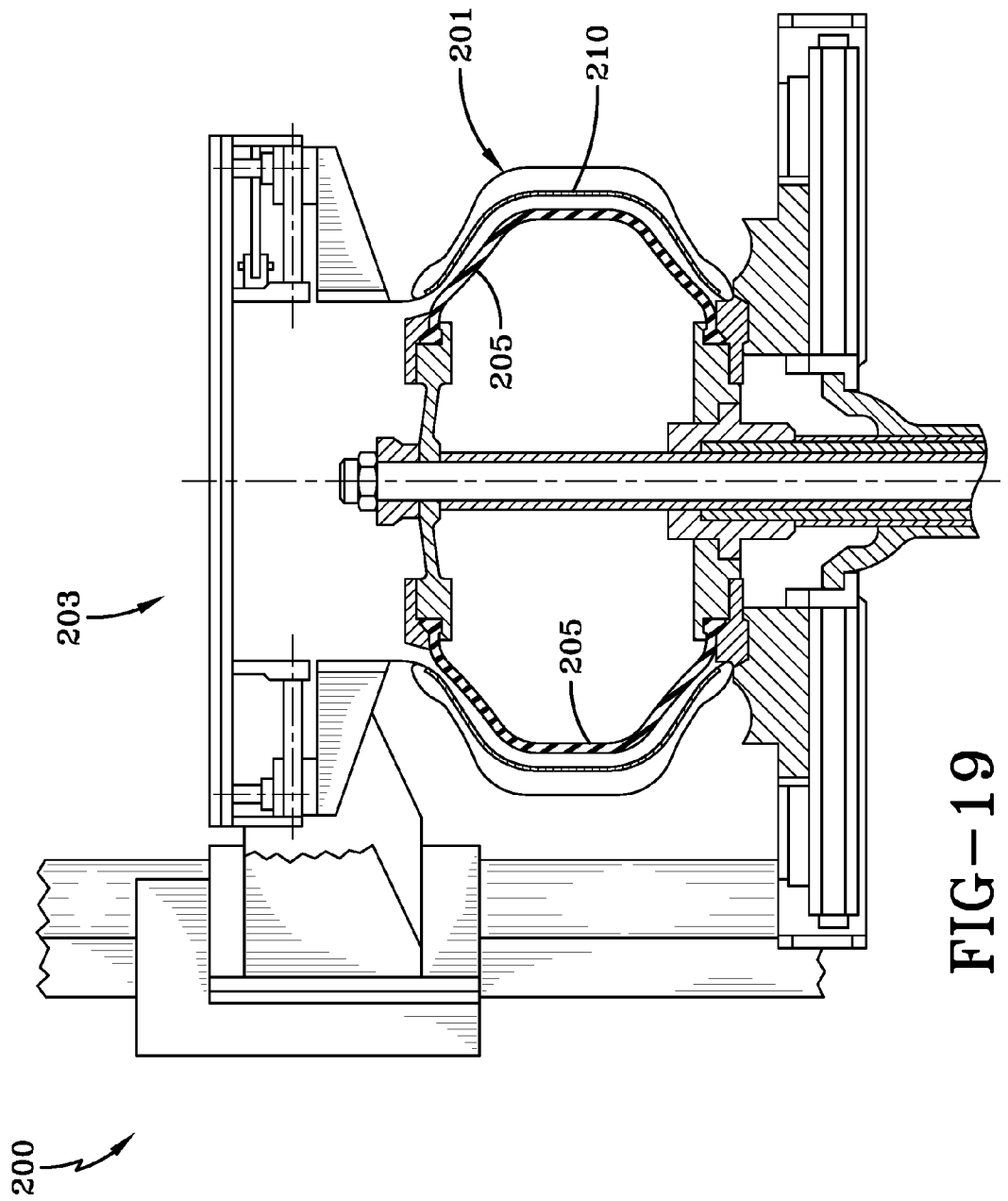

METHOD FOR APPLYING A BLADDER RELEASE AGENT BETWEEN A GREEN TIRE AND A BLADDER IN A TIRE CURING MACHINE

This Application claims the benefit of U.S. Non-Provisional Application Ser. No. 13/960905, filed on Aug. 7, 2013, which is incorporated herein by reference.

FIELD OF THE INVENTION

The present invention relates to tire manufacturing and, more particularly, to a system and method for a applying a bladder release agent to an interior surface of a green tire and then curing the green tire with the bladder release agent between the interior surface of the green tire and an inflatable bladder in a tire curing machine.

BACKGROUND OF THE INVENTION

In the manufacture of tires, typically used for automobiles and trucks, a green tire (one which is already formed/built, but not cured) is placed in an open mold within a conventional tire curing/molding machine. The green tire is positioned about a deflated bladder disposed within the mold section of the curing machine. Subsequently, the mold section is closed and sealed, the bladder is inflated against the interior surface to force the exterior surface of the green tire against the heated mold walls whereby the green tire receives a tread pattern. After some period of time, the green tire is cured, the inflatable bladder is deflated, the mold is opened, and the now cured tire ejected from the mold. The inflatable bladder may stick to the interior surface of the cured tire after the curing operation and deflation of the bladder. Consequently, a machine operator would manually separate the bladder from the interior surface of the cured tire so that the cured tire could be ejected and a new green tire inserted into the curing machine. This causes a costly and time consuming delay in the tire manufacturing process.

To lessen or eliminate this delay, a machine operator may spray a coating of bladder release agent on the interior surface of the green tire and/or the bladder with a paint gun prior to loading the green tire within the curing machine and inflating the bladder. While this technique may ensure that the bladder separates from the interior surface of the cured tire when curing is complete, it may still required a delay for the machine operator to individually spray each tire and/or bladder before the green tire is loaded into the curing machine. Further, the machine operator must carefully apply the bladder release agent to ensure that the bladder release agent completely covers the interface between the interior surface of the green tire and the bladder so that no part of the bladder sticks to the cured tire. Beside being a costly, time consuming process, which slows the production of tires, it may also be subject to operator error. This error may occur randomly with inconsistencies in application of the bladder release agent and sticking of part of the uncoated sections of the tire to the bladder.

Further, excess bladder release agent may accumulate on and contaminate the mold walls because of the tendency for dirt to cling to the viscous bladder release agent. This contamination may produce inconsistent heat transfer between the bladder and the interior of the green tire leading to undercured portions of the tire and, ultimately, accumulation of costly scrap. Additionally, this contamination may necessitate stoppage of the tire production line to clean the molds. Further, this method may not be adaptable to modern manufacturing techniques where the entire process is conducted by automated machines and/or robots.

A system, apparatus, and/or method of curing a green tire to prevent the sticking of the bladder to the interior of a cured tire, without a manual step by a machine operator may be desirable. It is an object of the present invention to provide such a system, apparatus, and method for applying a bladder release agent between a green tire and a bladder in a tire curing machine thereby obviating delay/scrap issues of conventional techniques.

SUMMARY OF THE PRESENT INVENTION

A lubricating system indirectly applies a bladder release agent to a green tire and cures the green tire in a tire curing machine. The system includes a deposition device and a curing bladder. The deposition device directly applies bladder release agent on to a deposition bladder. The deposition bladder is inflated within the green tire in order to deposit the bladder release agent on to an inner surface of the green tire. The curing bladder subsequently receives the green tire with bladder release agent deposited therein and cures the green tire.

According to another aspect of the lubricating system, a tire loader positions the green tire over the deposition bladder, removes the green tire from the deposition bladder, and positions the green tire over the curing bladder.

According to still another aspect of the lubricating system, the deposition device comprises a "sacrificial" green tire directly sprayed with bladder release agent.

According to yet another aspect of the lubricating system, the deposition bladder is the curing bladder and the "sacrificial" green tire is inserted over the curing bladder and the curing bladder is inflated for at least five seconds.

According to still another aspect of the lubricating system, a pre-cure bladder deposition machine is disposed along a conveyor system between a tire building machine and the curing bladder, the deposition bladder being part of the pre-cure bladder deposition machine.

According to yet another aspect of the lubricating system, the deposition bladder is the curing bladder.

A method indirectly applies bladder release agent to a green tire and cures the green tire. The method includes the steps of: directly applying bladder release agent on to a deposition bladder; inflating the deposition bladder within the green tire in order to deposit the bladder release agent on to an inner surface of the green tire; and subsequently curing the green tire with bladder release agent deposited therein.

According to another aspect of the method, the directly applying step further includes the steps of: positioning the green tire over the deposition bladder; indirectly applying bladder release agent to the deposition bladder; removing the green tire from the deposition bladder; and curing the green tire.

According to still another aspect of the method, the method further includes the step of directly spraying a "sacrificial" green tire with bladder release agent.

According to yet another aspect of the method, the method further includes the step of inflating the deposition bladder within another green tire during curing of the other green tire.

According to still another aspect of the method, the method further includes the step of providing a pre-cure bladder deposition machine disposed along a conveyor system between a tire building machine and a curing bladder, the deposition bladder being part of the pre-cure bladder deposition machine.

BRIEF DESCRIPTION OF THE DRAWINGS

The invention will be described by way of example and with reference to the accompanying drawings, in which:

FIG. 11 is a schematic elevation view of a tire loading paddle of the tire loader incorporating another conventional lubrication system;

FIG. 12 is a schematic view through line 12-12 of FIG. 11, showing a front view of the tire loading paddle of FIG. 11;

FIG. 19 is a schematic elevation view of the device of FIG. 17 under a still different condition.

DETAILED DESCRIPTION OF EXAMPLES OF THE PRESENT INVENTION

Figure 1:
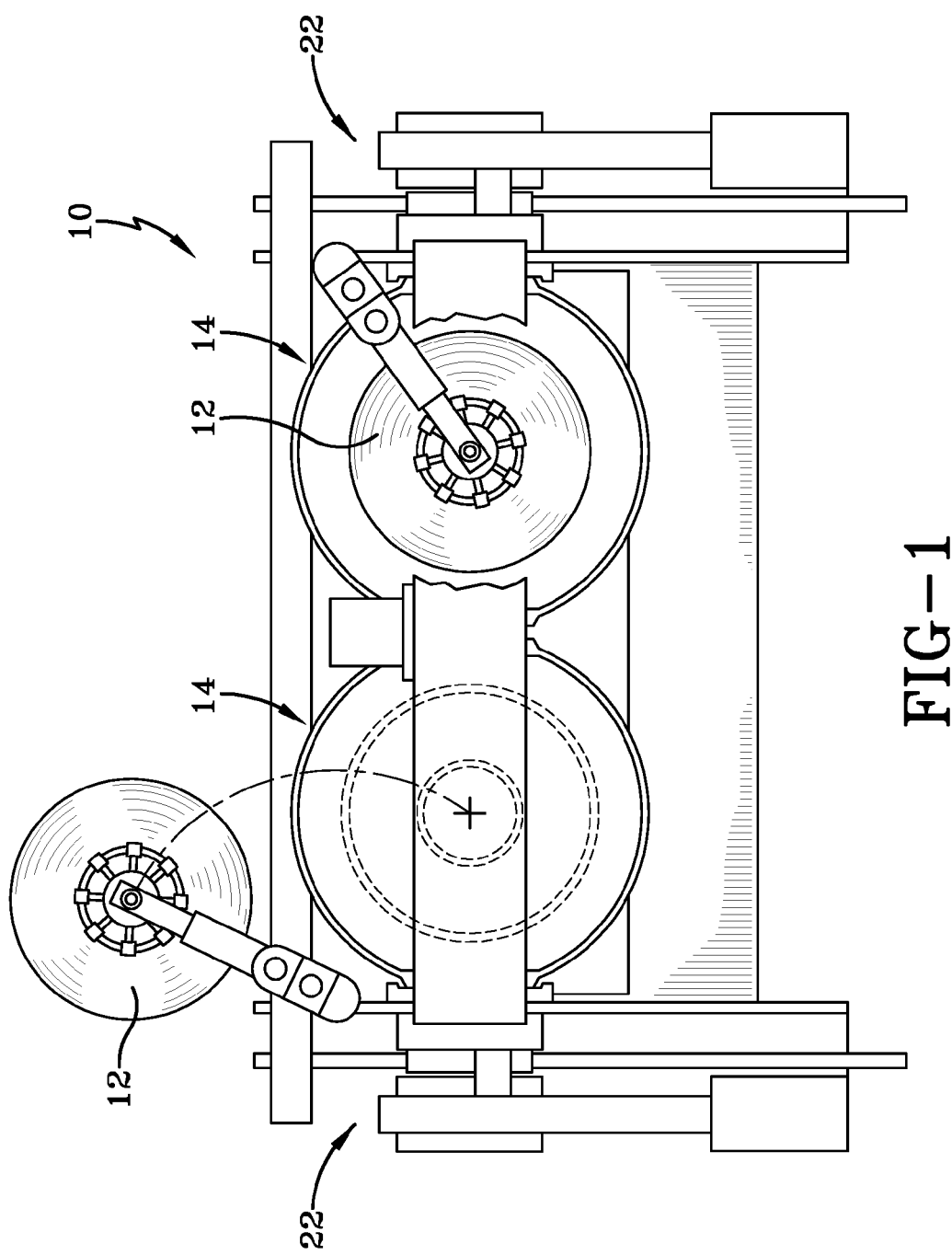
FIG. 1 is a schematic plan view of a tire curing machine for use with the present invention.
Figure 2:
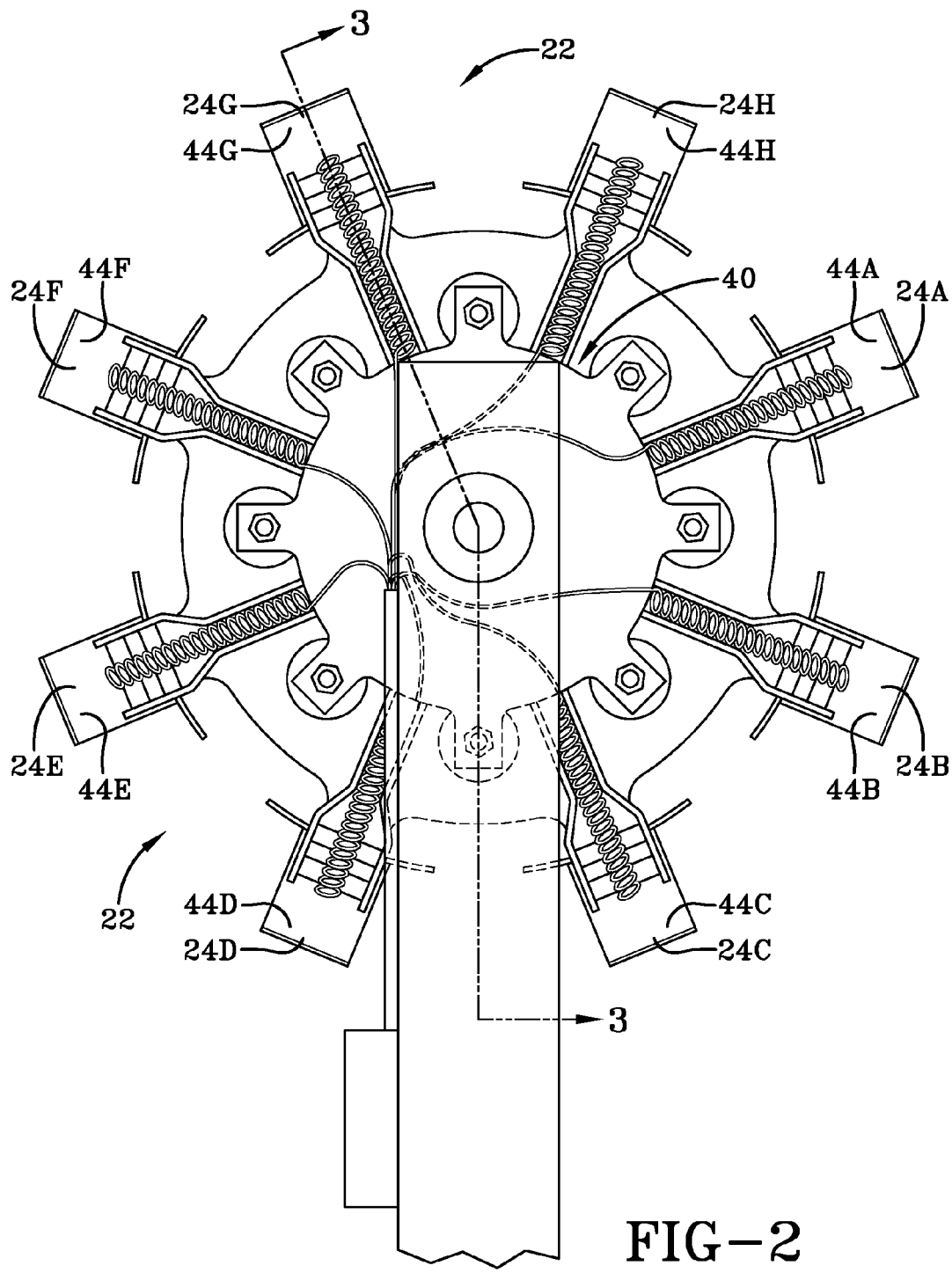
FIG. 2 is a schematic plan view of a tire loader having eight tire loading paddles of the tire curing machine of FIG. 1.
Figure 6:
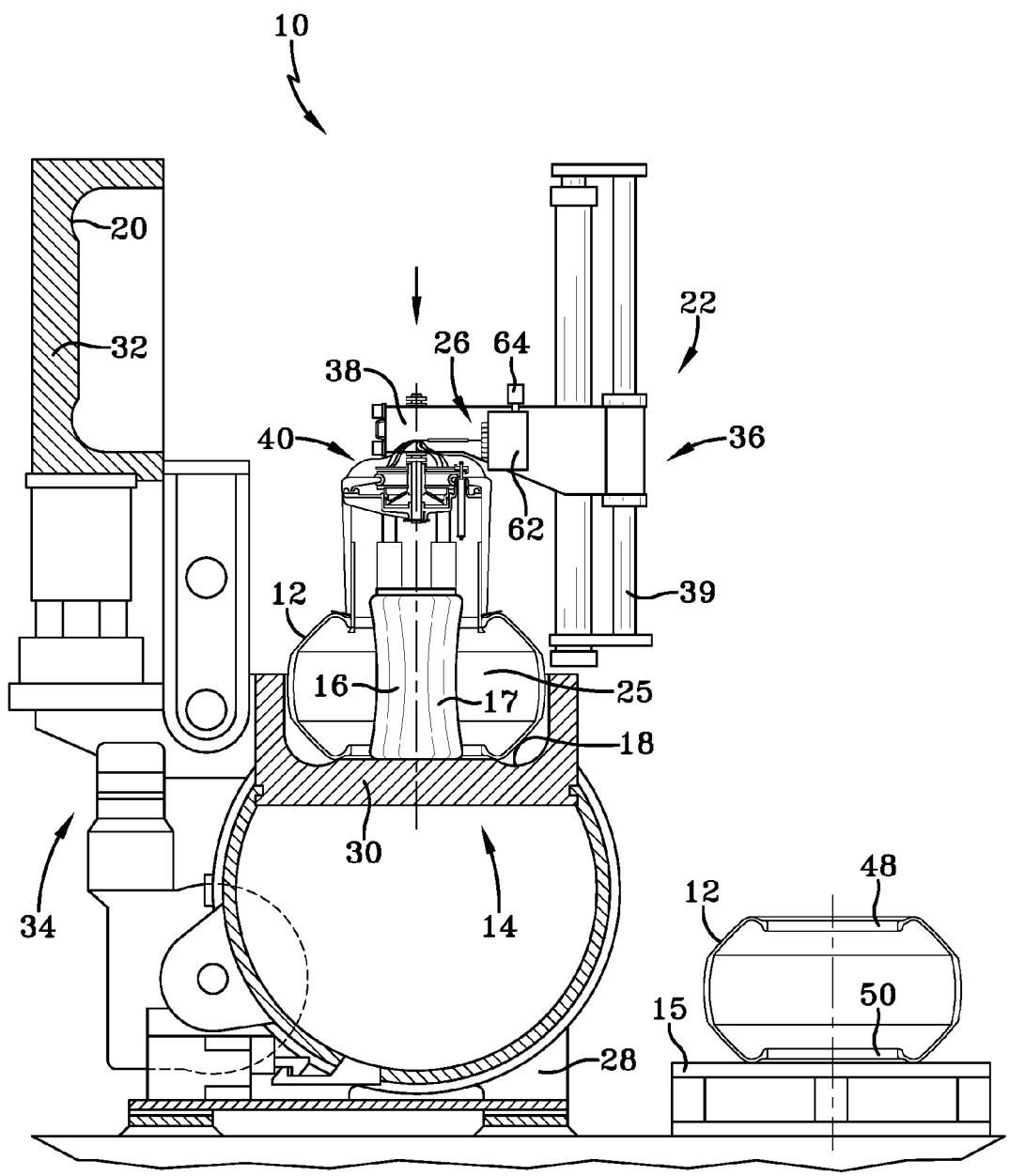
FIG. 6 is a schematic elevation view, partly in cross section, illustrating the tire curing machine of FIG. 1, with the green tire on a tire loader positioned over/around the bladder before release by the tire loader.
Figure 7:
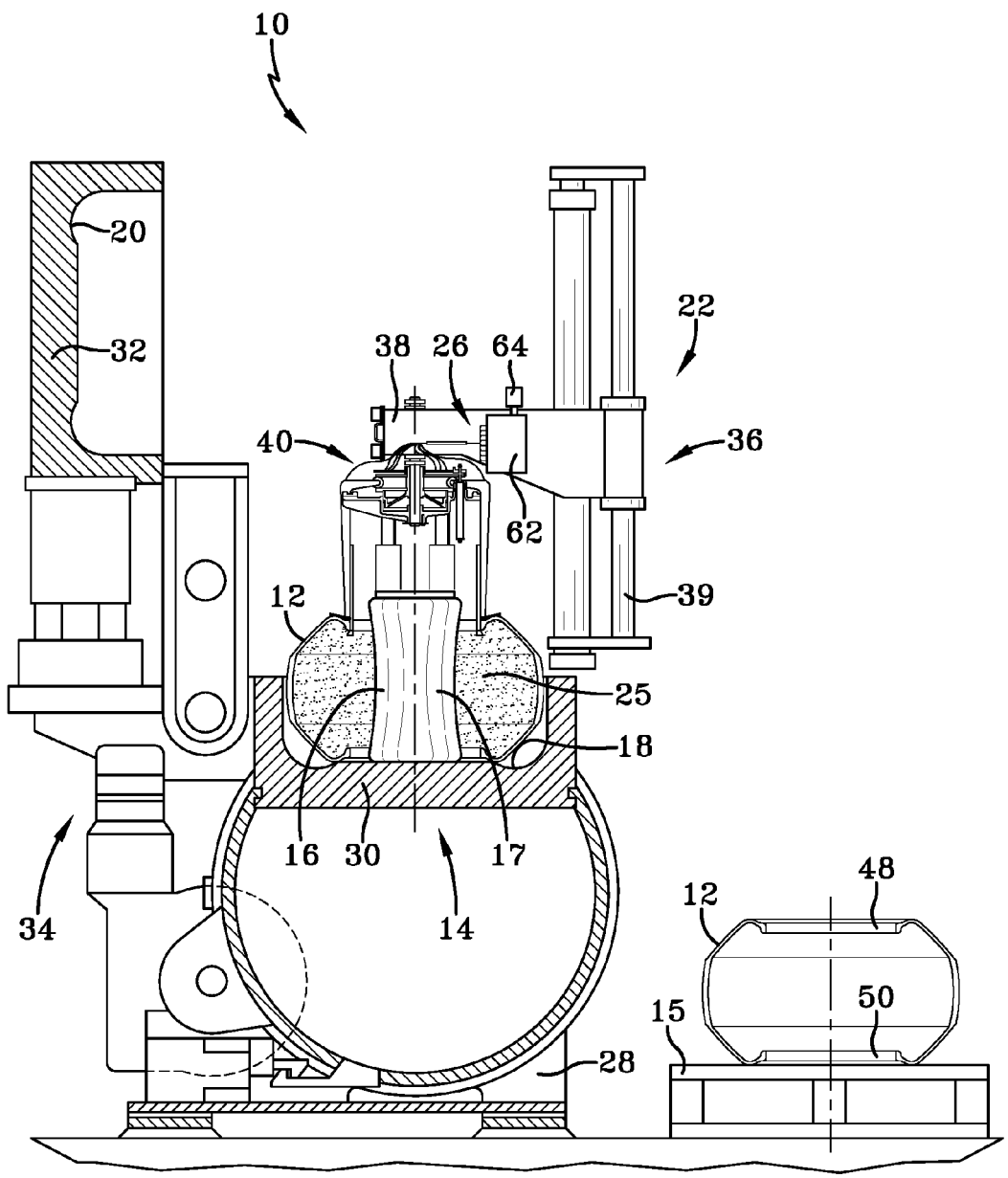
FIG. 7 is a schematic elevation view, partly in cross section, illustrating the tire curing machine of FIG. 1, after a mist of bladder release agent has been applied between the interior surface of the green tire and the bladder.
Figure 9:
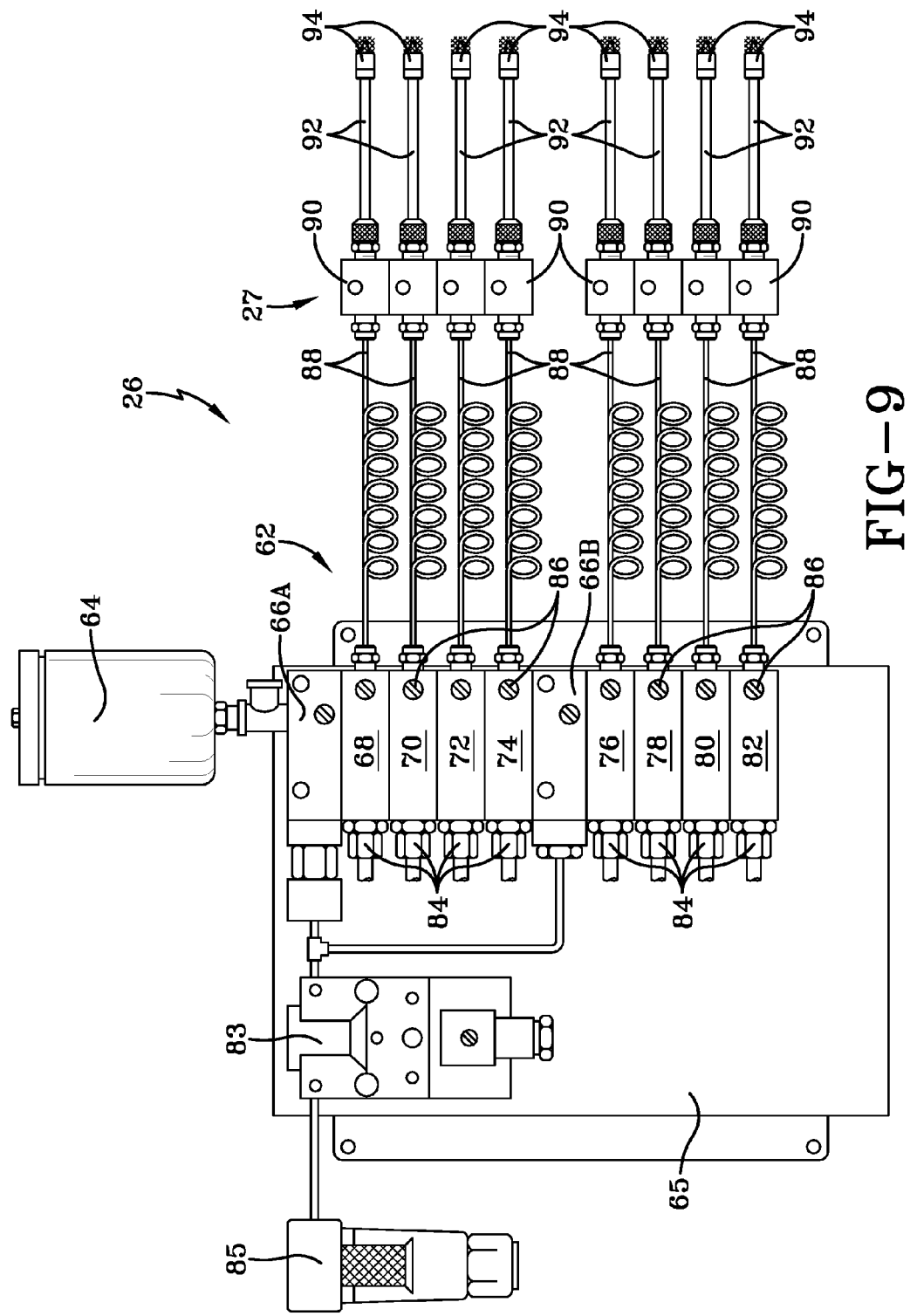
FIG. 9 is a schematic enlarged view of the conventional lubrication system.

Referring to FIGS. 1 & 4-7, a tire curing machine 10 is shown for curing a green tire 12 within a tire mold 14 having an inflatable bladder 16 for pressing the green tire against the inwardly facing surfaces 18, 20 of the tire mold 14. A tire loader 22, as shown in FIG. 2, includes a plurality of tire loading paddles 24A, 24B, 24C, 24D, 24E, 24G, 24H (24A-24H) for picking up a green tire 12 from a storage station, such as a platform 15, and loading it into a tire mold 14. A lubricating system 26 may mounted on tire loader 22 and have a lubrication delivery section 27, as shown in FIG. 9, secured to each of the plurality of tire loading paddles or support arms 24A-24H for applying a bladder release agent or lubricant into the enclosed space 25 between the green tire 12 and the inflatable bladder 16, as shown in FIGS. 6 & 7.

As shown in FIGS. 4-7, the tire curing machine 10 has a base support 28 onto which is secured the tire mold 14. The tire mold 11 has a bottom section 30 and a top section 32, shown in its upright, open position. A mechanism 34 for opening and closing the mold 14 is schematically illustrated. The mechanism 34 operates by pivoting closed the top section 32 and lowering it against the bottom section 30, where it is sealed in place. Alternatively, the mechanism 34 raises the top section 32 away from the bottom section 30, and then pivots the former open to a position as shown in FIGS. 4-7.

An inflatable bladder 16 having an outwardly facing surface 17 may be mounted within the tire mold 14 and secured to the bottom section 30. The bladder 16 may be inflated with air from a supply (not shown) and deflated as required. The inflatable bladder 16 may be constructed of rubber and/or an elastomer.

Figure 3:
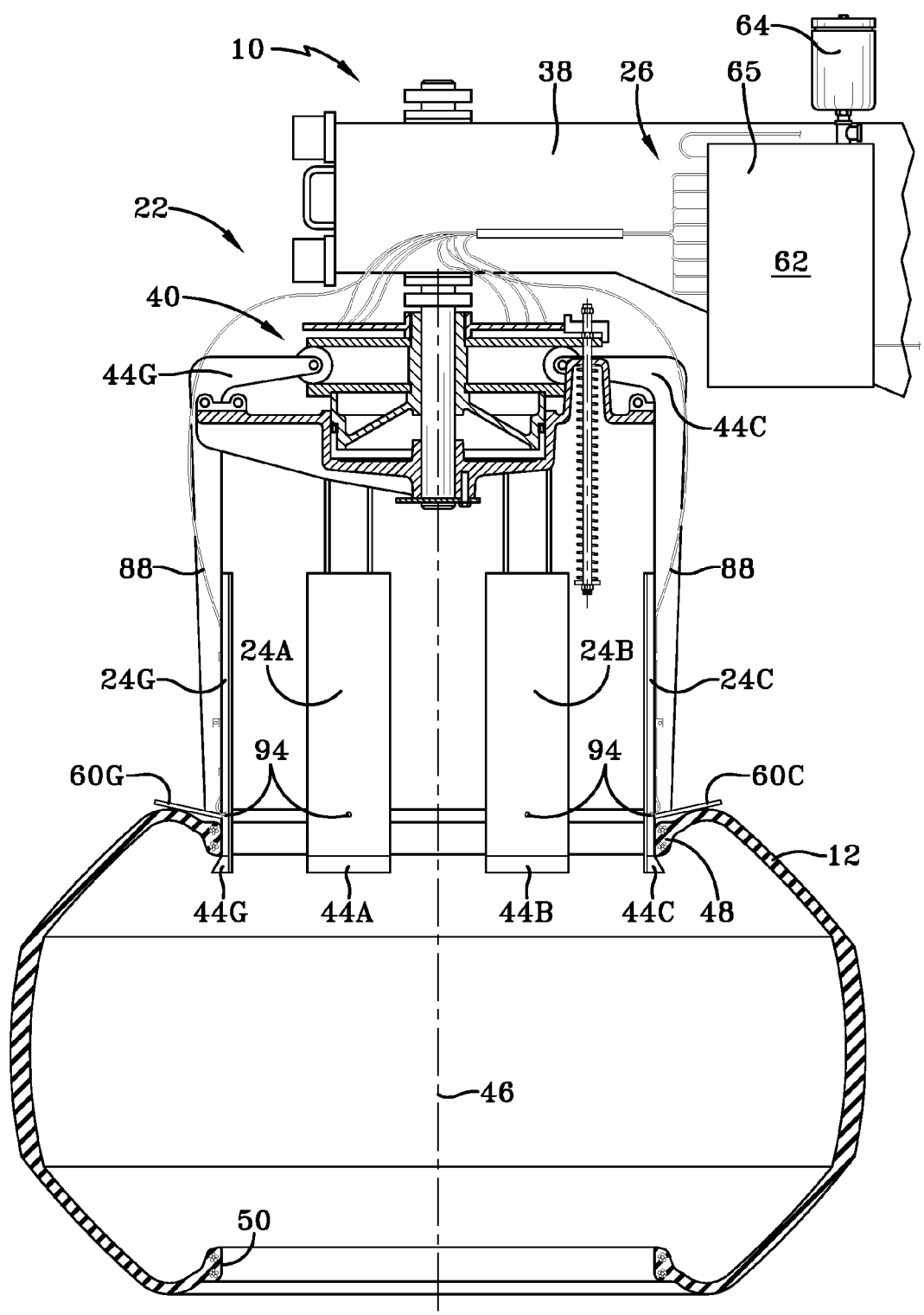
FIG. 3 is a schematic elevation view, partly in cross section, through line 3-3 in FIG. 2, showing tire loading paddles of the tire loader gripping a green tire.

The tire loader 22 may include an upright support 36 which is secured at its lower end to the base support 28. The upright support 36 may include a movable support structure 38 which moves up and down and pivots about a rod 39. The tire loading paddles 24A-24H may be secured at their upper end sections 42A,42B,42C,42D,42E,42F,42G,42H (42A-42H) to a support arm operator 40, which in turn may be mounted to the movable support structure 38. The upper end sections 42A-42H of the support arms 24A-24H, as shown in FIG. 3, may be pivotally mounted to the support arm operator 40 so that the lower end sections 44A,44B,44C, 44D,44E,44F,44G,44H (44A-44H) of the support arms 24A-24H may move radially outward and radially inward toward a centerline 46 extending through the tire loader 22. When the lower end sections 44A-44H are closest to the centerline 46, the effective diameter of a circle formed about the outwardly facing surface of the lower end sections 44A-44H of the tire loading paddles 24A-24H may be smaller than the diameter of the openings 48, 50 formed on either side of the green tire 12 so that the lower end sections 44A-44H may be easily inserted and/or removed from the opening 48 of the green tire 12.

Conversely, when the lower end sections 44A-44H are moved outward from the centerline 46, until the effective diameter of a circle formed about the outwardly facing surfaces of the lower end sections 44A-44H of the tire loading paddles 24A-24H is larger than the diameter of the openings 48, 50 formed on either side of the green tire 12, the lower end sections 44A-44H then press against the circular surface forming the opening 48 to securely grip the green tire 12 so that the green tire may be picked up and loaded into the mold 14.

Figure 8:
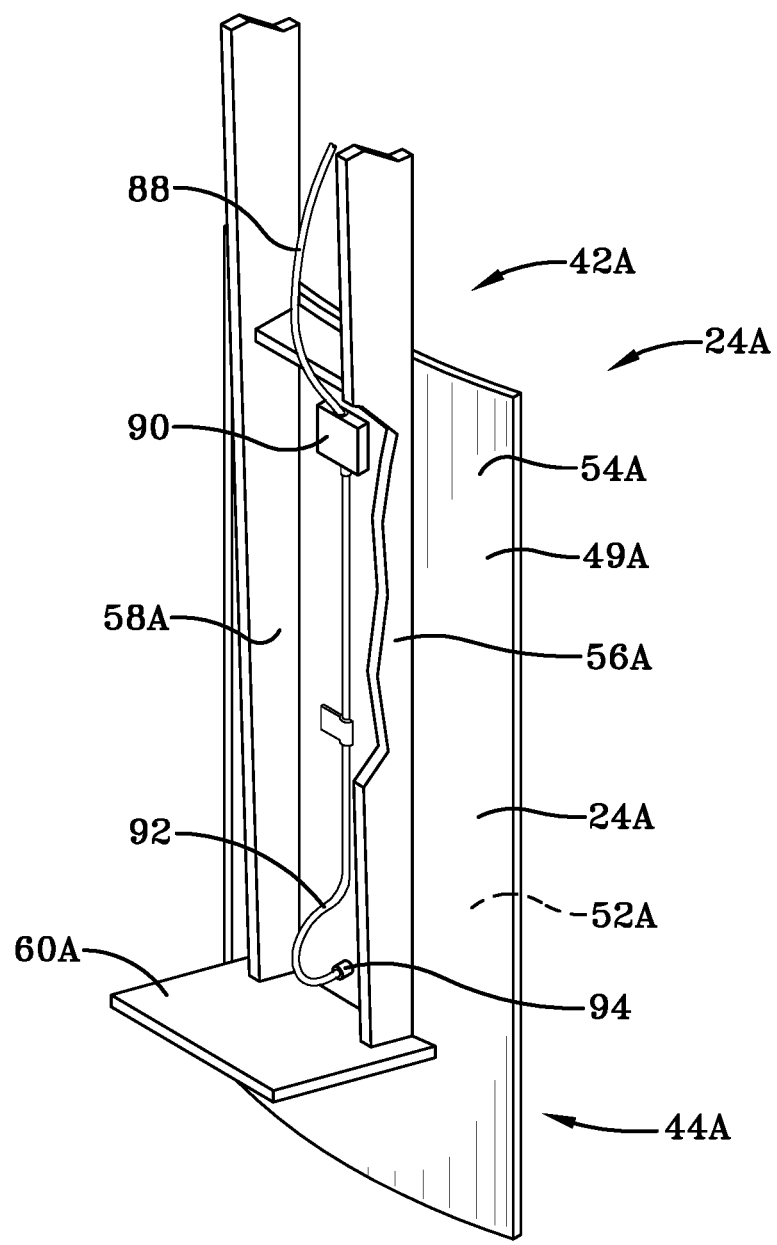
FIG. 8 is a schematic enlarged view of a tire loading paddle of the loading machine incorporating a feed line and nozzle of a conventional lubrication.

FIG. 8 shows a detailed illustration of a tire loading paddle 24A. Since the tire loading paddles 24A-24H may be substantially identical, only a description of the tire loading paddle 24A is included herein. The tire loading paddle 24A may have a curved, elongated plate section 49A with an inwardly facing curved surface 52A that faces the centerline 46 and an outwardly facing curved surface 54A mounted onto two elongated plates 56A, 58A. The upper ends of plates 56A, 58A may form an upper end section 42A and may be pivotally secured to the support arm operator 40. The lower ends of plates 56A, 58A may be secured in abutting relation to a stop plate 60A which extends substantially perpendicularly outward from the outwardly facing curved surface 54A of the plate section 49A.

During operation, the tire loading paddles 24A-24H may be moved downward and inserted into the opening 48 of the green tire 12 until the stop plates 60A-60H are abutted against the side wall of the green tire 12. Then, the upper end sections 42A-42H of the loading arms 12A-12H may be pivoted outward and away from the centerline 46, until the lower end sections 44A-44H of the elongated plate sections 49A-49H, such as the end sections 44A,44B,44C, 44G, shown in FIG. 3, frictionally engage the surface forming the opening 48 of the green tire 12 to securely grip the green tire and enable the green tire to be raised or lowered as it is loaded or removed from the mold 14.

A lubricating system 26 may include a fluid dispenser 62, as shown in FIG. 9. The fluid dispenser 62 may include an enclosure 65 containing eight separate pump units 68,70,72, 74,76,78,80,82 (68-82) stacked on one another. The enclosure 65, shown in FIG. 3, may be mounted on the movable support structure 38 of tire loader 22. However, the fluid dispenser 62 may be mounted at some other location on or adjacent the tire curing machine 10. The fluid dispenser 62 may further include a reservoir 64 of liquid bladder release agent and have two air pulse generators 66A, 66B actuated by a solenoid valve 83 drawing air through an air filter 85. The air pulse generators 66A, 66B may determine the stroke rate of the pump units 68-82. Air may be added immediately downstream of the pump units 68-82. The resultant output stream of air may be added to the liquid bladder release agent from the reservoir 64 to atomize the bladder release agent being pumped from the eight pump units 68-82. Eight injector-liquid adjustment knobs 84, one for each pump unit 68-82, may independently adjust the liquid output and air metering screws 86 may control the flow of air. Flexible capillary tubes 88 may be connected at one end to the individual pump units 68-82 and at the other end to the individual couplings 90, which in turn may be secured to each of the tire loading paddles 24A-24H. For each of the tire loading paddles 24A-24H, a delivery tube 92 may be attached at one end to the couplings 90 and at the other end to nozzles 94. The nozzles 94 may be individually mounted in a throughhole which extends through the lower ends 44A-44H of the plate sections 48A-48H of the tire loading paddles 24A-24H, such as adjacent the intersection of the plate section 48A with the stop plate 60A. The nozzles 94 may be positioned so that the spray of mold release agent is emitted at a downward directed angle with respect to the inner surface of each plate section 48A-48H.

In operation, the movable support structure 38 may initially move downward along the rod 39 with the tire loading paddles 24A-24H in a contracted position so that the lower ends 44A-44H may enter the opening 48 of the green tire 12 resting on the surface 15 until the stop plates 60A-60H engage the upward facing side surface of the green tire 12. Then, the upper end sections 42A-42H may be pivoted outward causing the radial distance of the tire loading paddles 24A-24H from the centerline 46 to increase, which thereby causes the lower end sections 44A-44H to frictionally engage the surface of the opening 48 of the green tire 12. Next, the movable support structure 38 may return upward along the rod 39 into the position shown in FIG. 4. The support structure 38 may then rotate about the rod 39 so that the green tire 12 is positioned above the bottom section 30 of the tire mold 14 with the lower opening 50 through the green tire 12 directly above the collapsed bladder 16. Next, the support structure 38 may be begin to move downward so that the stop plates press against the upward facing wall of the green tire 12 and seat the bead formed about the tire opening 50 against the bottom section 30 of the tire mold 14. Simultaneously with, or shortly before, the previous step, the lubricating system 26 may be activated and a mist of mold or bladder release agent sprayed from each nozzle 94 against the outer facing surface 17 of the collapsed bladder 16.

The confined space 25 between the inner surface of the green tire 12 and the outer surface 17 of bladder 16 may be filled with the mist of mold or bladder release agent. As the top section 32 begins to rotate and close against the bottom section 30 of the tire mold 14, the tire loading paddles 24A-24H may begin to retract towards the centerline 46 and move upward and away from the inner surface 18 of the bottom mold section 30. The support structure 38 may continue to move upward until the tire loading paddles 24A-24H are free from the opening 48 and above the bladder 16 so that the top section 32 of the tire mold 14 may close and seal the tire mold 14 for a subsequent curing step.

The nozzles 94 may be directed towards the collapsed bladder 16 so that the spray effectively covers the entire surface 17 of the bladder. However, the spray may be directed away from the bladder 16 so that the bladder release agent has more of a tendency to fill the enclosed space 25 between the bladder 16 and the inner surface of the green tire 12. The bladder release agent may be sprayed after the green tire 12 is placed on/over the bladder 16. This may reduce the possibility of the bladder release agent being able to escape from the enclosed space 25 between the bladder 16 and the interior surface of the green tire 12 and onto the interior surface of the tire mold 14 which may contaminate the tire mold and require more frequent cleaning. After the top section 32 of the tire mold 14 is secured and sealed onto the bottom section 30 of the tire mold 14, the bladder 16 may be inflated to force the green tire 12 against the interior mold walls 18, 20. After a specified cure time, the bladder 16 may be deflated and the tire mold 14 may be opened. Finally, the cured tire may be ejected and the process may begin again with another green tire 14.

Figure 10:
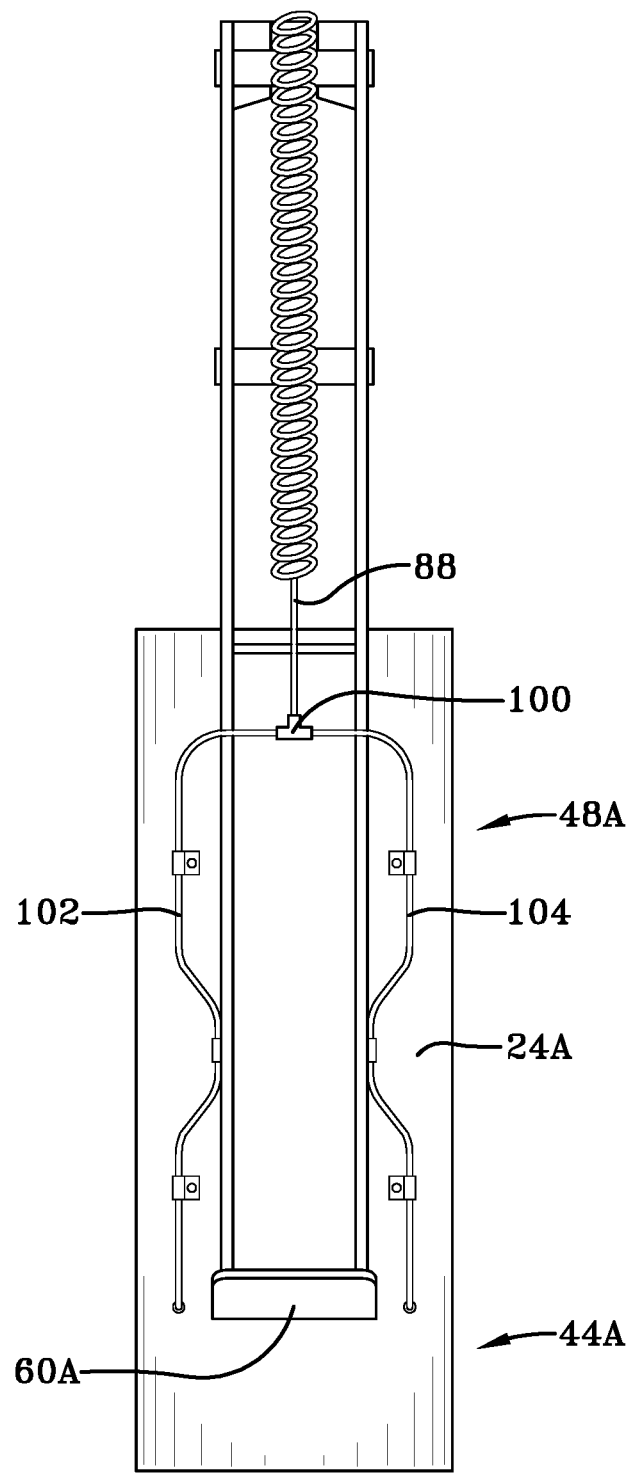
FIG. 10 is a schematic enlarged view of a tire loading paddle of the tire loader incorporating another conventional lubrication system.

Referring to FIG. 10, two nozzles 94 may be mounted in throughholes which extend through the lower end 44A of plate section 48A of the tire loading paddle 24A. While only the tire loading paddle 24A is illustrated, two nozzles 94 may be mounted in throughholes which extend through two or more, or all of the lower ends 44A-44H of the plate sections 48A-48H of the tire loading paddles 24A-24H to more evenly distribute the bladder release agent in the enclosed space 25 between the bladder 16 and the green tire 12. Each of the throughholes may be disposed between the longitudinal edges of the plate sections 48A-48H and the sides of the stop plates 60A-60H. The nozzles 94 may be positioned in the manner described so that the spray is emitted at a downward directed angle with respect to the inner surface of the plate sections 48A-48H.

This conventional lubricating system 26 may be essentially identical to that shown in FIG. 9 up to the flexible capillary tubes 88, which may be connected at one end to the individual pump units 68-82, as shown in FIG. 9. However, the other end of capillary tubes 88 may be connected to a coupling 100, which in turn may be secured to the tire loading paddles 24A-24H. Two delivery tubes 102, 104 may be each attached at one end to the coupling 90 and at the other end to a nozzle 94. The nozzles 94 may be secured in throughholes which extend through the plate sections 48A-48H so that the spray of bladder release agent is emitted as previously discussed.

Referring to FIGS. 11-15, a nozzle 110 may be a divergent spray cone nozzle. Since all of the nozzle and lubricating system arrangements, one mounted on each of the tire loading paddles 24A-24H, are substantially identical, only a description of the arrangement of the tire loading paddle 24A is included herein. However, all or some of the nozzles 94 may be replaced with the nozzle(s) 110. The nozzle 110 may have a closed outlet end 112 with an orifice 114 which extends through a front wall 116 to a bore 118 which opens at a rear inlet end 120. The rear inlet end 120 may be threaded for attachment to a pressure valve 122, as described below.

A cylindrical collar 124 may be disposed intermediate the inlet and outlet ends 120, 112. The nozzle 110 may be mounted to the lower end 44A of the plate section 49A of tire loading paddle 24A by insertion of the outlet end 112 into a throughbore 126 of a clamp collar 128 mounted onto the outwardly facing curved surface 54A so that the outlet end 112 of the nozzle 110 projects outward from an opening 130 in the lower end 44A of the plate section 49A. Note that the opening 130 may be disposed to one side of a longitudinal axis 134, see FIG. 12, through the tire loading paddle 44A. The collar 124 may abut the clamp collar 128 and be secured therein by a means, such as a set screw (not shown).

Figure 13:
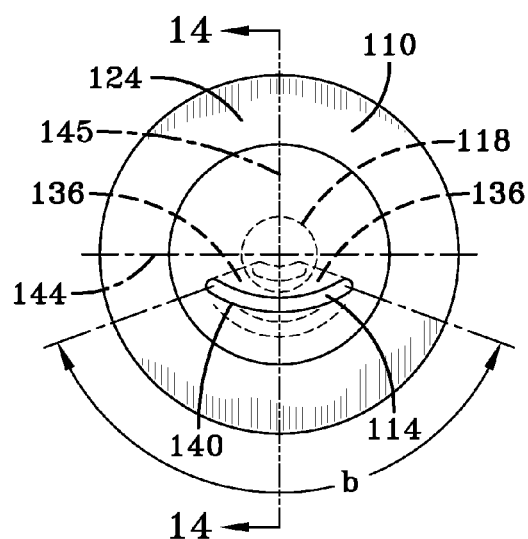
FIG. 13 is a schematic front detail view of an orifice of the nozzle of the system of FIG. 11.
Figure 14:
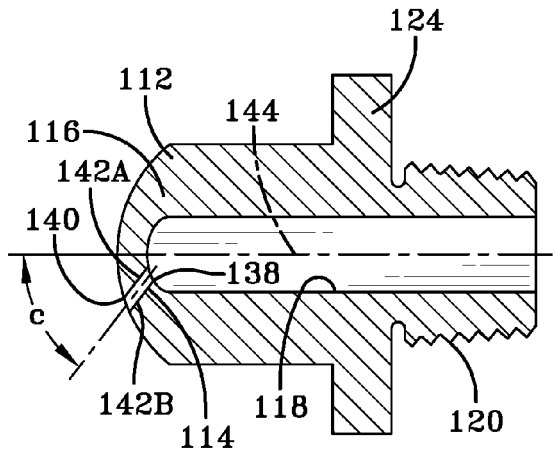
FIG. 14 is a schematic view through line 14-14 of FIG. 13, showing a side cross-sectional view of the nozzle of the system of FIG. 11.

Referring to FIGS. 13 & 14, the orifice 114 of the nozzle 110 may be have a flat, narrow slot which angles along the sidewalls 136 from an inner opening 138 to an outer opening 140 such that the inner opening is smaller than the outer opening. An angle b from the inner opening 138 to the outer opening 140 may be between about 80° to about 120°. The flat interior upper and lower walls 142A, 142B of the orifice 114 may be parallel and extend from the inner opening 138 to the outer opening 140 to form an angle c with respect to a first plane 144 through the nozzle 110, which may be between about 35° and about 55°, and specifically about 45°.

As shown in FIGS. 11 & 12, the nozzle 110 may be mounted to the tire loading paddle 24A so that the first plane 144 through the nozzle 110 is disposed substantially perpendicular to the inwardly facing surface 52A of the tire loading paddle 24A. Further, the nozzle 110 may be located to one side of the axis 134 through the center of the tire loading paddle 24A so that a second plane 145 through the center of the nozzle 110, which is perpendicular to the first plane 144 of the nozzle 110 (see FIG. 13), may be disposed at an angle d of about 10° to about 50°, or about 25° to about 35°, or about 30° with respect to the axis 134. The spray cone 150 emitted from the orifice 114 may be directed downward across the axis 134, as shown in FIG. 12, and toward the centerline 46 through the tire loader 24a, as shown in FIG. 11.

Figure 15:
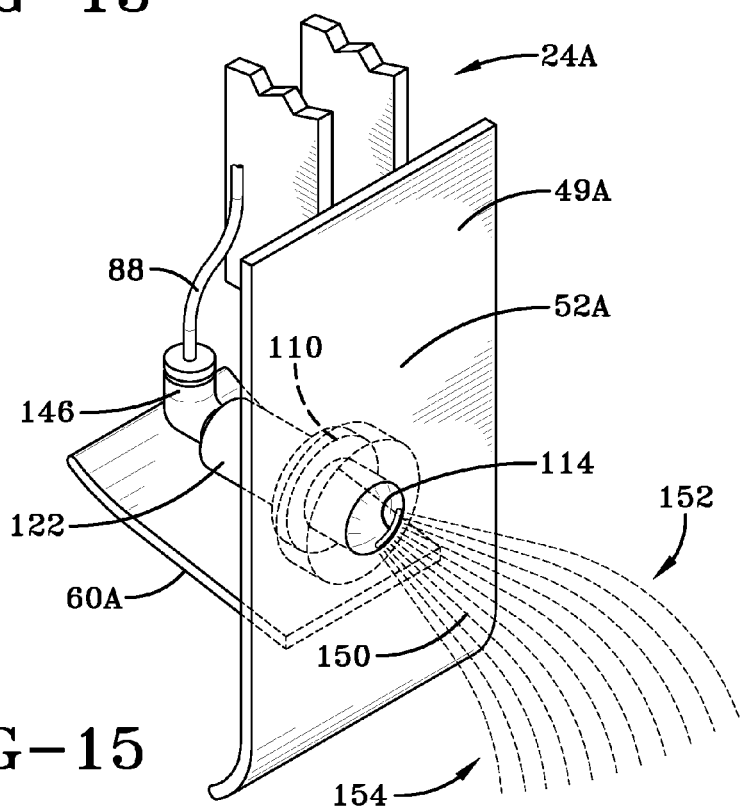
FIG. 15 is a schematic perspective view of the tire loading paddle of FIG. 11, showing the spray pattern of the nozzle of the system.
Figure 16:
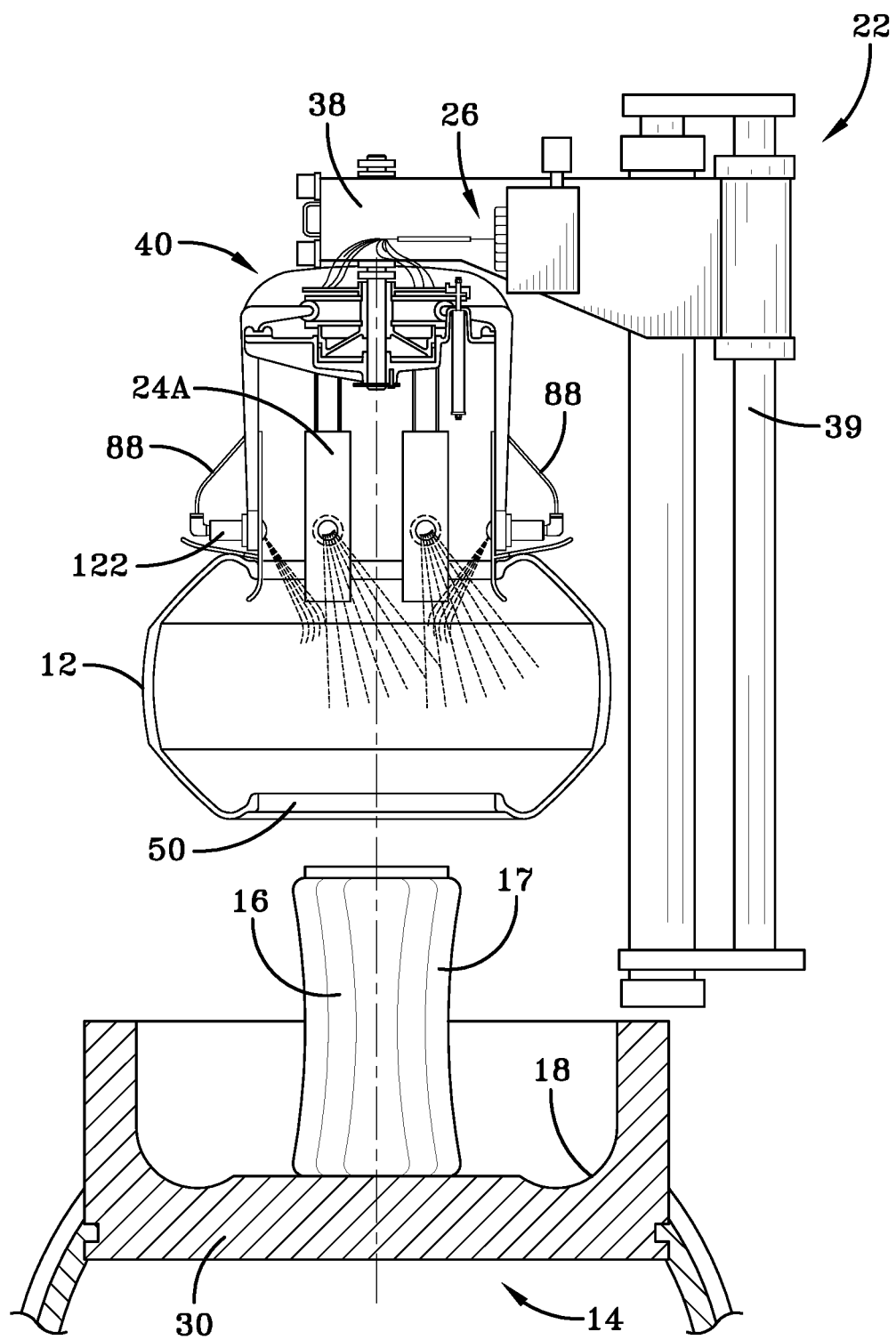
FIG. 16 is a schematic elevation view, partly in cross section, illustrating an additional pre-spray step of operation of the conventional tire curing machine.

The lubricating system of FIG. 16, which includes the nozzle 110 shown in FIGS. 11-15, may be essentially identical to the lubricating system 26 shown in FIG. 9, up to the flexible capillary tubes 88. While the flexible capillary tubes 88 are shown connected to individual pump units 68-82 in FIG. 8, in FIGS. 11, 15 & 16, the other end of the capillary tubes 88 may be connected to one end of a coupler 146. The opposite end of the coupler 146 may be connected to the pressure valve 122.

Due to the shape and orientation of the orifice 114 of the nozzle 110, a spray of bladder release agent may exit the orifice 114 in a relatively flat, divergent spray cone 150 and be directed downward and toward the centerline 46 of the tire loader 22. Additionally, the orientation and structure of the nozzle 110, as discussed above, may cause the spray cone 150 of bladder release agent to exit the orifice 114 and cross the longitudinal axis 134. As illustrated in FIGS. 11, 12 & 15, the orientation and structure of the orifice 114 combined with the effect of the pressure on the upper surface 152 of the spray cone 150 being higher than the pressure on the undersurface 154 of the spray cone 150 and the effect of gravity creates a "curling effect" of the spray pattern 151 forming the spray cone 150. That is, the spray cone 150 of bladder release agent from the nozzle 110 may be curled downward and toward one side of the lower section 49A of the tire loading paddle 24A.

At the same time, the spray pattern may have a tendency to swirl in the clockwise direction because of the orientation and structure of the orifice 114 of the nozzle 110. This spray pattern 151, when emitted from each nozzle 110 mounted to the lower section 49A-49H of the loading paddles 24A-24H, may distribute the bladder release agent onto both the bladder 16 and the interior surface of the green tire 12 when sprayed in the confined space 25 therebetween. The swirling, curled spray pattern 151 emitted from each of the nozzles 110 may also pre-spray the inner surface of the green tire 12, as discussed below.

The nozzle 110 may also be self-cleaning. The nozzle 110 may be mounted so that, as the tire loading paddles 24A-24H are being withdrawn after the bladder 16 has begun to inflate, the rubbing of the inflatable bladder against the opening 140 of the orifice 114 may clean the opening 140 from residual bladder release agent.

Figure 4:
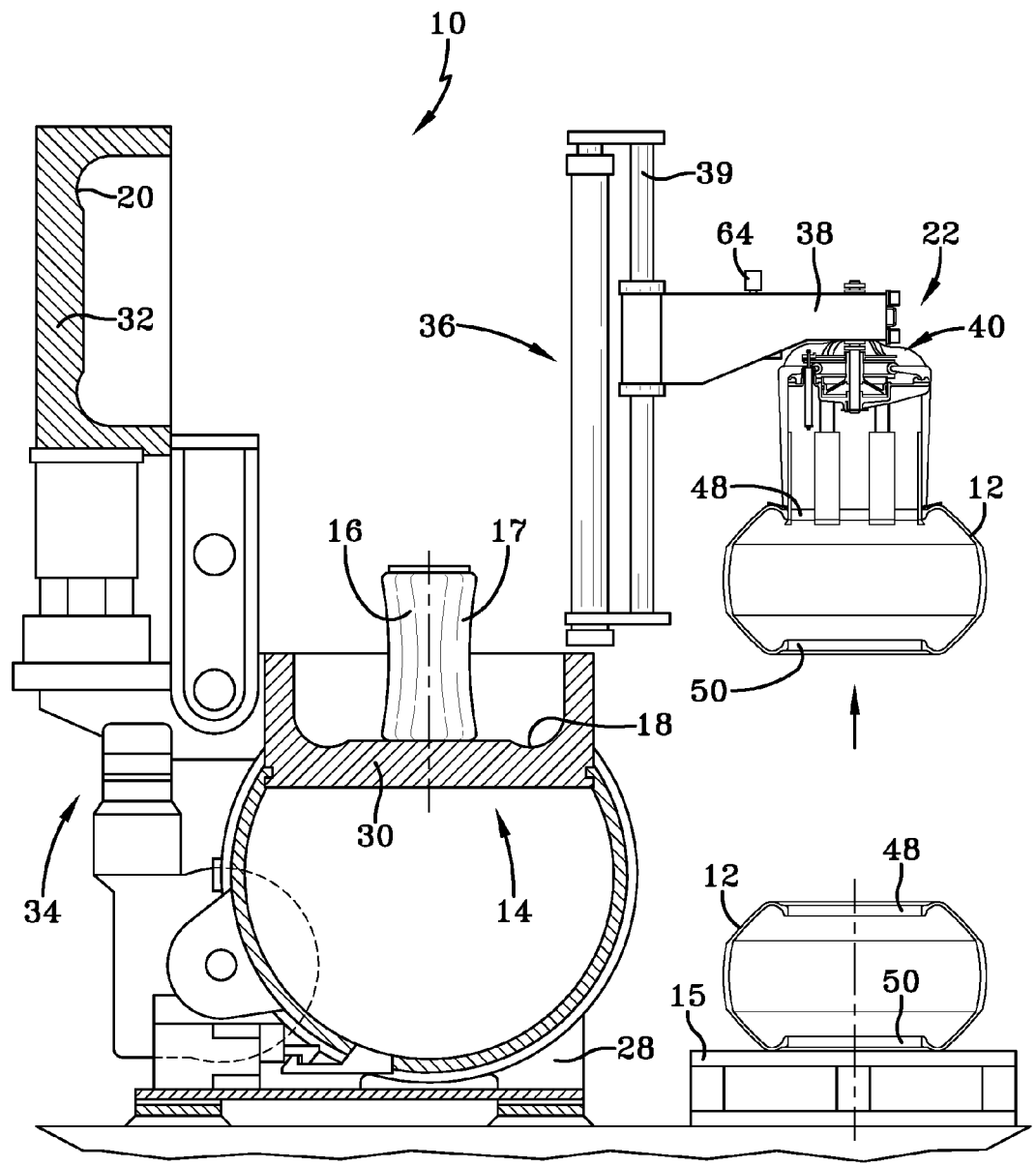
FIG. 4 is a schematic elevation view, partly in cross section, illustrating the tire curing machine of FIG. 1, and a green tire on a tire loader, prior to being loaded into the tire curing machine.
Figure 5:
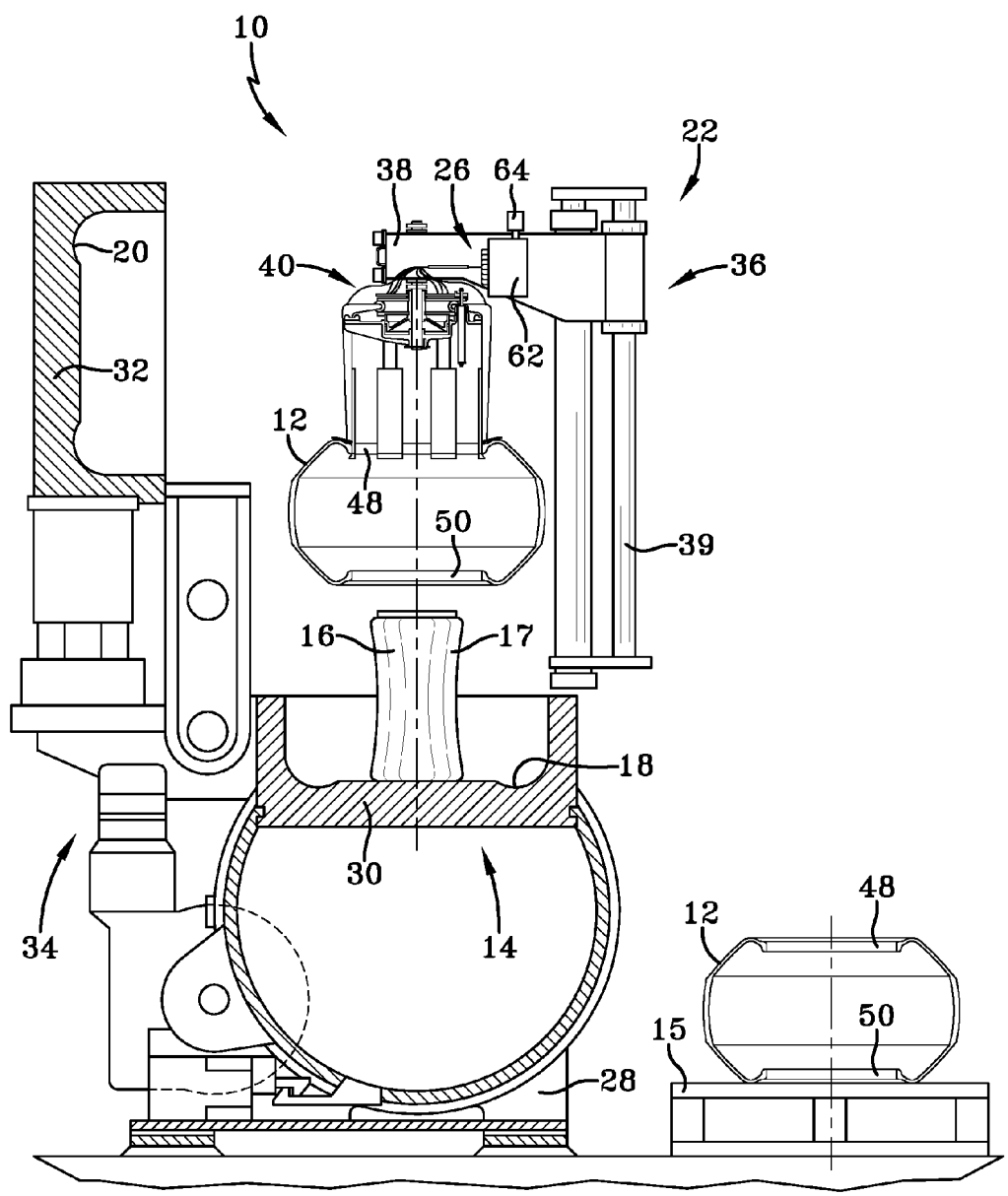
FIG. 5 is a schematic elevation view, partly in cross section, illustrating the tire curing machine of FIG. 1, with the green tire on a tire loader positioned directly above the bladder, just prior to being loaded into the mold.

Referring to FIG. 16, the tire curing machine 10 may also use a pre-spray step in its cycle of operation. The movable support structure 38 may initially move downward along the rod 39, as shown and described above, with the tire loading paddles 24A-24H in a contracted position so that the lower ends 44A-44H of the tire loading paddles 24A-24H may enter the opening 48 of the green tire 12 resting on the surface 15, as shown in FIG. 4, until the stop plates 60A-60H engage the upward facing side surface of the green tire 12. Then, the upper end sections 42A-42H may be pivoted outward causing the radial distance of the tire loading paddles 24A-24H from the centerline 46 to increase, which may further cause the lower end sections 44A-44H to frictionally engage the surface of the opening 48 of the green tire 12. The movable support structure 38 may subsequently return upward along the rod 39 into the position shown in FIG. 4. The support structure 38 may then rotate about the rod 39 so that green tire 12 is positioned above the bottom section 30 of the tire mold 14 with the lower opening 50 through the green tire 12 directly above the collapsed bladder 16. The bladder release agent may then be pre-sprayed onto the inner surface of green tire 12, as shown in FIG. 16.

The curling of the spray, as discussed above, may cover the lower interior half and the lower bead about the opening 50 of the green tire 12. During the pre-spraying step, the spray of bladder release agent may not enter the tire mold 14 because of heated air (e.g., about 350° F.) flowing upward from the tire mold. Next, the support structure 38 may move downward so that the stop plates 60A-60H press against the upward facing wall of the green tire 12 and seat the bead formed about the tire opening 50 against the bottom section 30 of the tire mold 14. Simultaneously with this step, the lubricating system 26 may be activated and a mist of bladder release agent may be sprayed from each nozzle 110 against the outer facing surface 17 of the collapsed bladder 16.

The space 25 may be confined between the inner surface of the green tire 12 and the outer surface 17 of the bladder 16 and may be filled with the mist of bladder release agent. The nozzles 110 may also begin spraying the bladder release agent as the nozzles pass the bladder 16 during the downward movement of the support structure 38 towards the tire mold 14. After the top section 32 of tire mold 14 begins to rotate and close against the bottom section 30 of tire mold, the tire loading paddles 24A-24H may retract towards the centerline 46 and move upward and away from the inner surface 18 of the bottom mold section 30. The support structure 38 may continue to move upward until the tire loading paddles 24A-24H are free from the opening 48 and above the bladder 16, so that the top section 32 of the tire mold 14 may close and seal the tire mold for the curing process.

Figure 17:
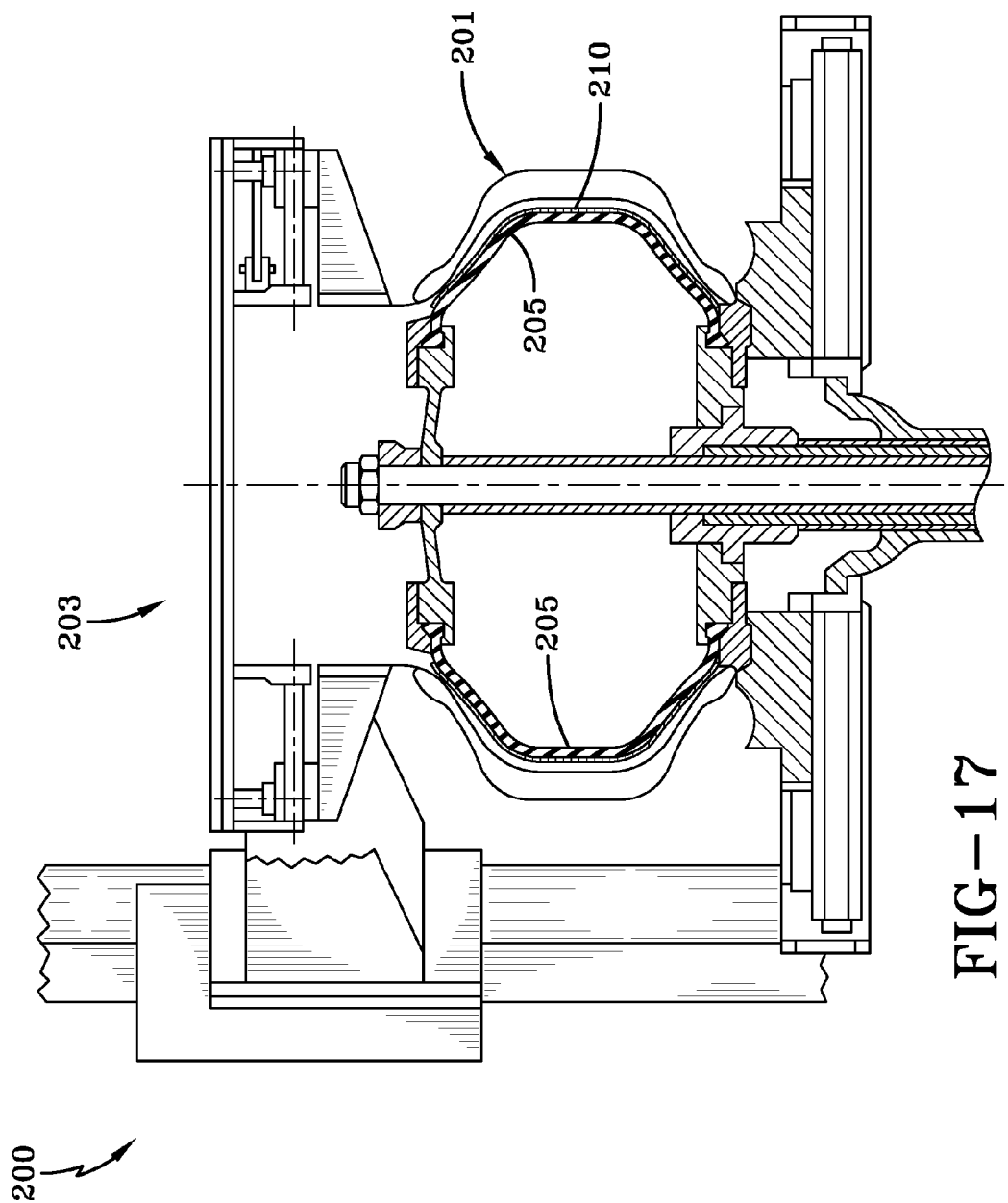
FIG. 17 is a schematic elevation view of a device in accordance with the present invention.
Figure 18:
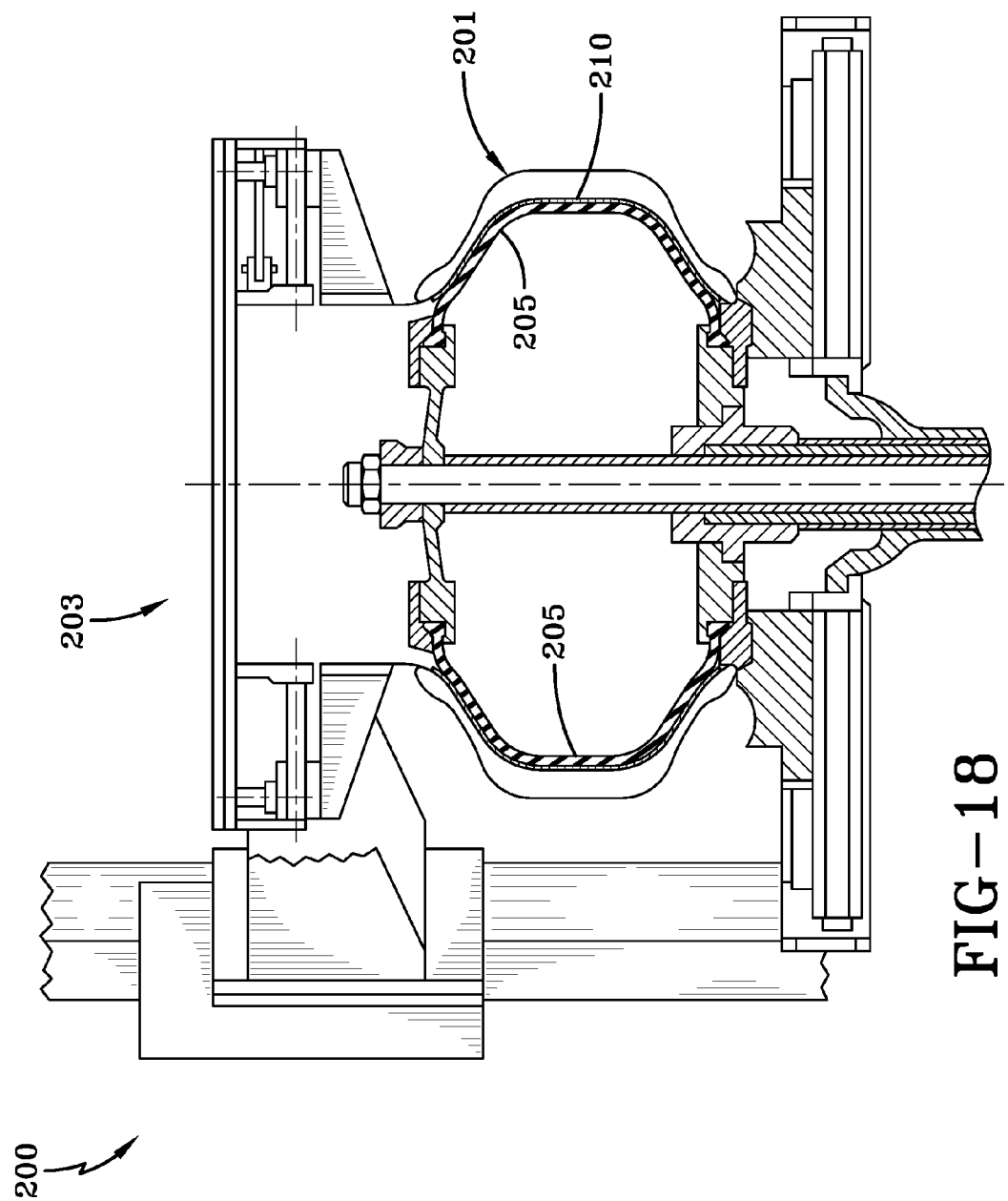
FIG. 18 is a schematic elevation view of the device of FIG. 17 under a different condition.

A system 200 and method 200 in accordance with the present invention may limit the amount of excessive release agent 210 on a green tire 201, but also deposit the release agent where it is needed in the green tire for releasing the green tire adequately from the deflated bladder 16. The system/method 200 may utilize an indirect technique for applying the release agent 210 to the green tire 201 (FIGS. 17-19). This indirect technique 200 may allow enhanced control of the amount/quantity of deposited release agent 210 and its location on a surface of the green tire 201. As described above, conventional practices utilize a direct application of the release agent (e.g., spraying) to the inside surface of an un-vulcanized/green tire 201.

The indirect transfer technique 200 may coat the inside of the green tire 201 with release agent 210 without having to directly spray any surface of the green tire. The indirect technique 200 thus may eliminate/mitigate the issue post cure cracks forming in the innerliner. The cracks may be created by the directly sprayed on release agent accumulated at the strip edges of the innerliner and in between the strips causing the strips to not cure to each other. This indirect technique 200 was evidenced by a control area on the inside of several green tires that cured properly, but was not sprayed and had no post-cure cracks. This led to the conclusion that enough release agent 210 was transferred from the green tire 201 to the bladder 205 in the previous cure cycle.

The indirect technique 200 may use a "sacrificial" green tire 201. The inside of this sacrificial green tire 201 may be directly sprayed with release agent 210 (FIG. 17). The sacrificial green tire 201 may then be inserted into a release deposition machine 203 and the bladder 205 may be inflated for a few seconds (FIG. 18). Thus, the green tire 12 is not cured, but used to transfer the release agent 210 from the sprayed green tire 205 to the curing bladder 16 in the curing machine 10. This deposition of release agent 210 may thereby eliminate the direct spraying of production tires 12. Depending on the type/size of green tire 201, this indirect technique 200 may be repeated every 5 to 20 cure cycles.

The indirect technique 200 may utilize a pre-cure bladder deposition machine 203 disposed along a conveyor system (not shown) between a tire building machine and the curing machine 10. To reduce cure cycle time, this technique 200 is not practiced close to the curing machine 10 itself. An inflatable depositing/deposition bladder 205 may be directly sprayed, placed inside the green tire 201, and inflated. Release agent 210 may thereby be transferred from the deposition bladder 205 to the inside of the green tire 201 (FIGS. 17-19). This bladder deposition machine 203 may replace a conventional direct spray machine 22.

In addition to the advantages discussed above, the system 200 and method 200 of the present invention more effectively and completely coat the inner surface of the green tire 201 during the curing process. In accordance with the present invention, a system 200 and method 200 applies a bladder release agent 210 between a green tire 201 and a bladder 16 in a tire curing machine 10 thereby obviating the issues and limitations of conventional systems. According to the present invention, a mist of bladder release agent 210 may be placed onto a pre-bladder 205 so that the pre-bladder may inflate and coat the inner surface of the green tire 201 with an amount of bladder release agent sufficient to allow release of the cured tire from the tire mold 14 after curing, but not excessive enough to leave significant amounts of bladder release agent 210 on the tire mold 14.

While the invention has been described in combination with various other features, it will be evident that many alternatives, modifications, and variations are apparent to those skilled in the art in light of the foregoing teachings. Accordingly, the present invention is intended to embrace all such alternatives, modifications, and variations as fall within the spirit and scope of the appended claims below.

What is claimed is:

1. A method for indirectly applying bladder release agent to a green tire and curing the green tire, the method comprising the steps of:
   directly applying bladder release agent on to a deposition bladder;
   inflating the deposition bladder within the green tire in order to deposit the bladder release agent on to an inner surface of the green tire;
   providing a pre-cure bladder deposition machine disposed along a conveyor system between a tire building machine and a curing bladder, the deposition bladder being part of the pre-cure bladder deposition machine; and
   subsequently curing the green tire with bladder release agent deposited therein.

* * * * *